United States Patent Office 3,288,644
Patented Nov. 29, 1966

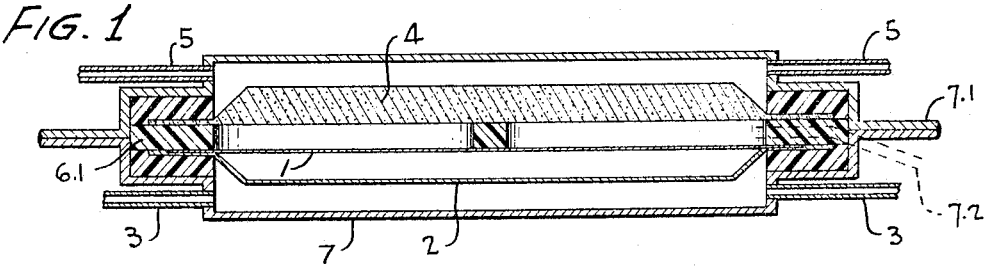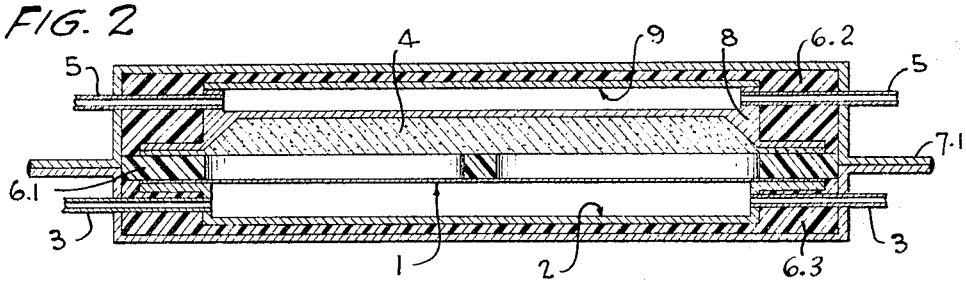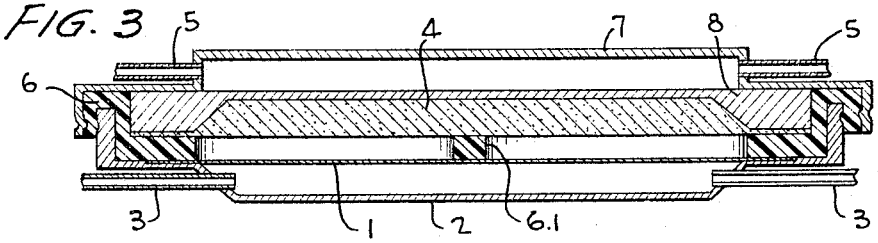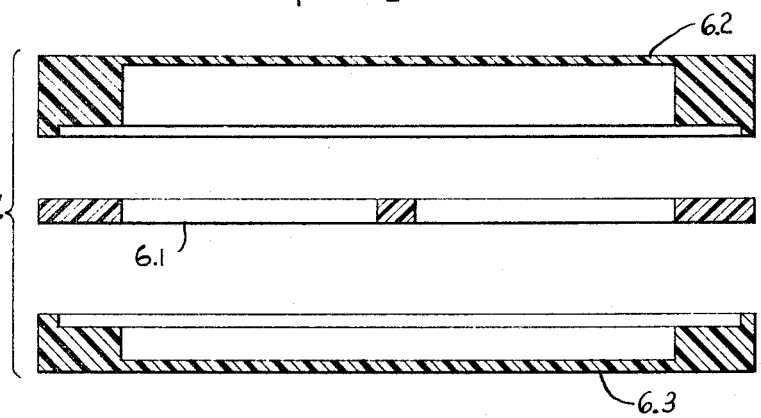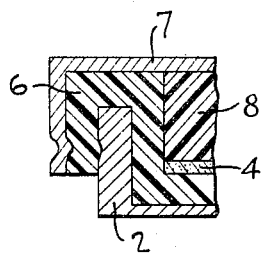
INVENTOR
JOSEPH C. DELFINO

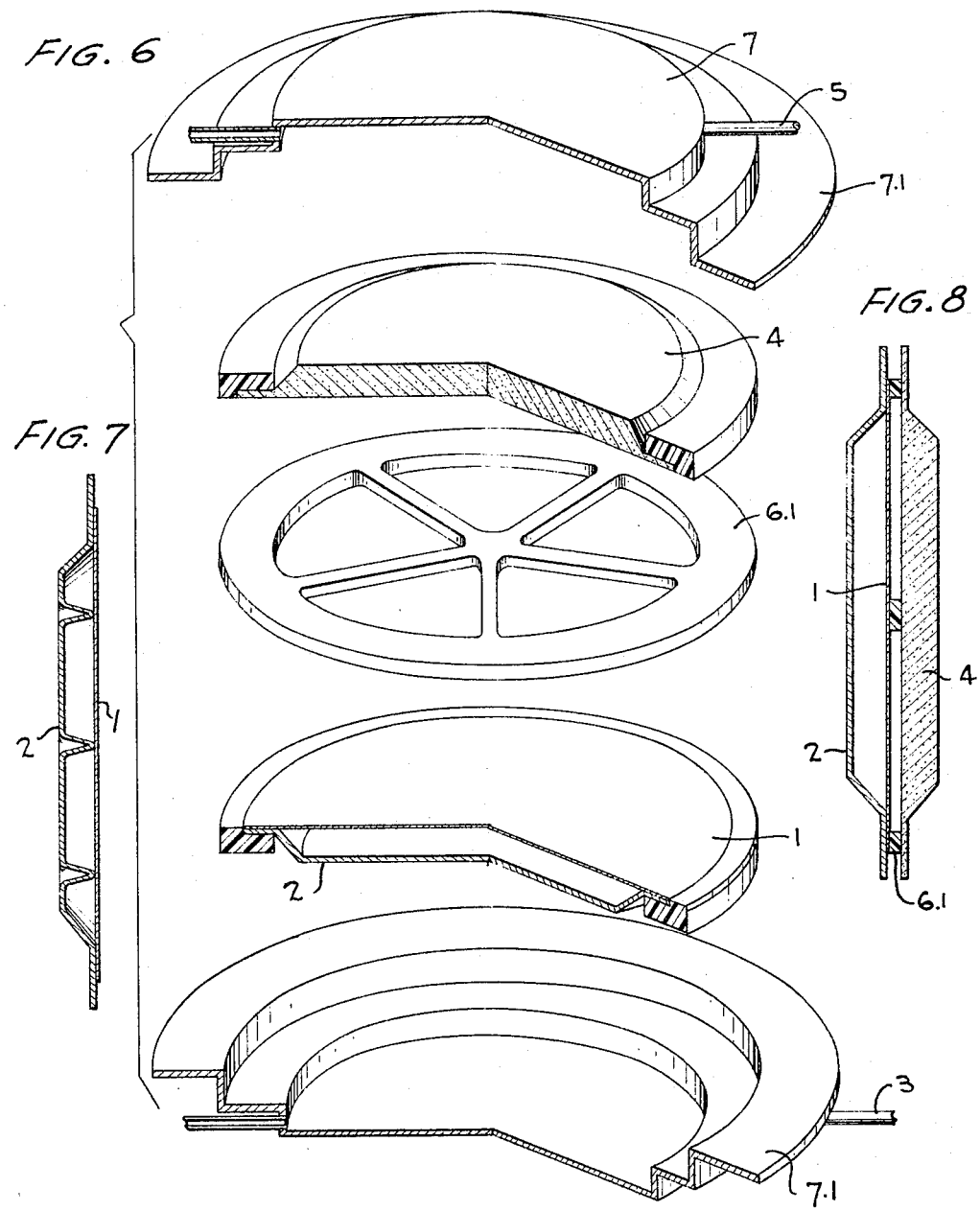

3,288,644
FUEL CELL MODULE WITH PALLADIUM-SILVER ALLOY ANODE
Joseph C. Delfino, Mamaroneck, N.Y., assignor to Leesona Corporation, Warwick, R.I., a corporation of Massachusetts
Filed June 18, 1962, Ser. No. 203,056
5 Claims. (Cl. 136—86)

This invention relates to an improved fuel cell. More particularly, it relates to the construction of a self-contained fuel cell module which has a minimum number of elements in its construction, is light in weight, and is extremely compact. The novel module design permits the stacking of any number of units connected in series or parallel to obtain the required voltage or increased amperage.

A fuel cell according to the instant specification is a device which converts the energy of a chemical reaction between a fuel and oxidant directly into low voltage, direct current electricity. Thus, the basic problem encountered in obtaining an efficient system is essentially one of chemical kinetics. In such a cell it is necessary to carry out the reaction of the fuel and oxidant so that the amount of energy degraded into heat is as small as possible. At the same time the reaction rate must be high enough to economically produce sufficient current output from a practical sized cell.

A typical cell in its most simplified form consists of a housing, a fuel electrode, an oxidizing electrode, an electrolyte positioned between the electrodes and means for the introduction of the fuel and oxidant to their respective electrodes. In operation the fuel enters the anode or positive side of the cell and impinges on the electrode at a fuel-electrolyte interface of the anode, the fuel reacts with an ionic oxidizing agent leaving the electrode electrically charged. The electric charges are drawn off through an external route to generate more of the oxidizing ions at the cathode. These then migrate to the anode to complete the circuit.

Fuel cells are particularly attractive commercially because of the cells' potential performance characteristics. Thus, in comparison with a conventional battery, a fuel cell has a longer possible life time, less weight on a kilowatt hour per pound basis, higher efficiency, lower heat and simpler design. In comparison with a gas turbine, a fuel cell's efficiency will range from about 40% to 90% compared with about 30% for the gas turbine. Since there is no combustion within the cell, fuel cells are not subject to Carnot's Heat Law which states that the heat output of a device is equal to the amount of heat input minus internal losses.

Despite the potential advantages of a fuel cell, prior art units have not been completely practical from a commercial standpoint since they generally cannot deliver high currents or high voltages. Thus, to obtain increased voltages or high currents, it is necessary that a number of cells be connected in series to raise the total voltage or in parallel to increase the amperage. When this is done the power-to-weight and power-to-volume ratios are considerably cut down, with the ratios being lower than in some batteries. Additionally, the prior art cells require a considerable amount of auxiliary equipment including feed lines, valves, pressure sensors, controls, heat exchangers, etc., for operation, thereby increasing the cumbersomeness of the system. As a further disadvantage, fuel cell systems employing the prior art homo-porous and bi-porous fuel electrodes are confronted with inherent problems due to blocking of the pores with inert or unconsumed gases or flooding of the pores with electrolyte.

Accordingly, it is an object of the instant invention to provide a fuel cell module which has a low space requirement per unit cell.

It is another object of the invention to provide a fuel cell module which has a high power-to-weight and high power-to-volume ratio.

It is another object of the invention to provide fuel cell modules which can be stacked and connected in series or parallel to raise the total voltage or amperage in the cell.

It is another object of the invention to provide a fuel cell system which reduces to a minimum the amount of auxiliary equipment needed for operation.

These and other objects of the invention will become more apparent from the following detailed description with particular emphasis being placed on the illustrative drawing and working embodiment.

In accordance with the instant invention, a self-contained fuel cell module is constructed from a non-porous palladium-silver alloy hydrogen diffusion anode, a homo-porous or bi-porous cathode, and an aqueous electrolyte. The cell is characterized by its simplicity of design and relatively low number of components. In the drawing, FIGURE 1 is an illustration in cross-section of a fuel cell module comprising a two-piece outer casing with a peripheral weld. The outer casing functions as one side of the fuel and oxidant compartment and the electrodes function as the second side.

FIGURE 2 is a second embodiment of a fuel cell module very similar to the one shown in FIGURE 1, illustrating in cross-section an anode and cathode assembly independent from the two-piece outer casing.

FIGURE 3 is a third embodiment of a self-contained fuel cell module, illustrating in cross-section an assembly wherein the module is sealed by spinning.

FIGURE 4 indicates more in detail the three-piece gasketing employed in the module of FIGURE 2.

Similar gasketing arrangements are used in FIGURES 1 and 3.

FIGURE 5 depicts an enlarged cross-sectional view of the spinning detail of the module of FIGURE 3.

FIGURE 6 is an exploded view, partly in cross-section of the fuel cell of FIGURE 1.

FIGURES 7 and 8 are illustrative of the back-up plate which can be employed to support the anode in the instant modules.

The fuel cell modules shown in FIGURES 1, 2 and 3 are extremely compact units permitting the stacking of any number of modules to obtain the required voltage or amperage. Inasmuch as the modules, as a characteristic feature, employ a minimum number of components, they possess a decided space-saving advantage. Of equal importance in the module's construction is the mode of holding the complete module together, and the advantage of being able to substantially completely assemble the unit prior to sealing the casing by welding or spinning. Since no bolts are employed in assembly, leakage in the cell is substantially impossible. Further, the only hardware needed is the fuel and oxidant inlet and outlet means which can be attached to the outer casing, as in FIGURES 1 and 3, or attached to the cover of the anode and cathode asemblies, as in FIGURE 3, prior to the welding or spinning of the casing, closing the module. Additionally, each unit has its own electrolyte. Thus, in operation if one module of the cell becomes defective, it is a simple matter to completely remove and replace the defective module or to disconnect the module from the system without physically removing it.

Since the anode employed is a non-porous palladium-silver alloy membrane, salvage value of the module is high. As is apparent, in a homo-porous or bi-porous structure, the most substantial cost of the eletrode is in the manufacture to obtain uniform porous openings. However, the processing of the palladium-silver alloy anode is relatively inexpensive, the major expense being in the cost of the actual membrane. Substantially all of the membrane cost can be regained by recovering the membrane from the damaged module.

In the construction of the cells, it is preferred that the gas feed and gas vent of the anode and cathode be diametrically opposed, as shown in the drawing, the arrangement permitting better purging of the fuel cell system. However, it is not necessary that the fuel inlet and outlet be diametrically opposed, it being possible to have the fuel inlet and outlet at up to substantially right angles and still obtain effective performance.

Referring more specifically to the drawing, in FIGURE 1 the module contains an anode assembly consisting of a non-porous palladium-silver element 1 welded or brazed to a metal back-up plate 2 which plate, together with outer casing 7 forms a hydrogen fuel chamber behind the palladium-silver element. Gas entry and exit ports 3 are welded to the outer casing prior to assembly. The cathode assembly consists of a sintered electrode 4 supported by a back-up plate 8 which is an integral part of the cathode. Gas entry and exit ports 5 are welded to the outer casing prior to assembly. The oxidant chamber is defined by the cathode and the outer casing. Polytetrafluoroethylene, commonly referred to as Teflon, a trademark of the Du Pont Corporation, gasket 6 insulates the anode from the cathode and the electrodes from the outer casing. One section of the gasketing is a spider gasket 6.1 which limits the amount of electrolyte in the module. The gasketing can be constructed as one piece or as individual units. The two-piece outer casing 7 has a flange 7.1, at which point the module is peripherally welded together. At assembly the gasketing and anode and cathode are inserted into one piece of the two-piece outer casing and the second piece is put in place and the entire assembly compressed against the Teflon gasketing. A seam, peripheral weld is then applied to the flange of the outer casing to seal the module. The filling of electrolyte is accomplished through a filling port in the casing 7.2.

FIGURE 2 is substantially similar to FIGURE 1, however, the entire anode and cathode assemblies, including the fuel and oxidant chambers are independent of the outer casing. In this manner there is little chance of electrolyte coming into contact with any part of the outer casing. Further, the complete assembly, including the filling of the electrolyte, if desired, can be accomplished prior to the welding of the module. Thus, more specifically, the module comprises an anode assembly consisting of a non-porous palladium-silver element 1 welded or brazed to a metal back-up plate 2 which is shaped to form a hydrogen chamber behind the element. Gas entry and exit ports 3 are welded to the back-up plate and diametrically opposed to each other. The cathode assembly consists of a sintered electrode 4 on a perforated back-up plate 8 which is recessed to form an air chamber. A cover 9 is welded to the back-up plate to close the chamber. Gas entry and exit ports 5 are welded to the cover and are substantially diametrically opposed to one another. A three-piece Teflon gasket and spider 6, more fully shown in FIGURE 4, insulates the anode from the cathode and both electrodes from the two-piece outer casing. One section of the gasket is spider shaped, 6.1, which spaces the electrodes from each other and controls the amount of electrolyte employed in the module. Sections 6.2 and 6.3, as seen more clearly in FIGURE 2, separate the housing of the cell from the anode and cathode assemblies. The two-piece outer casing 7 has a symmetrically shaped flange 7.1, which flange is peripherally welded to hold the module together. The assembling of the cell is accomplished substantially as in FIGURE 1.

FIGURE 3 illustrates a third embodiment wherein the module casing is spun to obtain a gastight and liquid-tight seal. Thus, the basic module consists of an anode assembly made of a non-porous palladium-silver element 1 welded or brazed to a metal back-up plate 2 which is shaped to form a hydrogen chamber behind the element. The back-up plate, which also serves as one piece of the outer casing, functions as a container for the cathode. Gas entry and exit ports 3 are welded to the back-up plate in diametrically opposite position prior to the assembly of the module. The cathode assembly, composed of a sintered electrode 4 and the porous back-up plate 8, is one complete unit. The back-up plate is recessed to provide an air chamber. The combination Teflon gasket 6 insulates the anode from the cathode and the electrodes from the outer casing. Metal cover 7 with air entry and exit ports 5 and the cathode define the oxidant chamber. Teflon spider 6.1, which can be constructed as an integral part of the gasketing or as a separate unit, controls the space between the electrodes and thus governs the quantity of electrolyte which will be used in the cell. If desired, a support complex, welded or brazed to the internal back-up plate, can be used to support the anode. Such structures are indicated more specifically in FIGURES 7 and 8. At assembly the cover is spun to the combination gasket for sealing. Electrolyte is added to the module through a filling port provided on the anode back-up plate. The spinning detail is shown more specifically in FIGURE 5. Since the art of spinning is well developed, the particular details employed will not be indicated herein. However, it is noted that it is only necessary to apply uniform pressure to the spot which is to be spun.

FIGURE 4 indicates in more complete detail the three-piece gasketing assembly which is employed in the cell, particularly in the module of FIGURE 2. Thus, it can be seen that the Teflon spider functions as a support means for both the anode and for the cathode. The gasketing system is extremely simple, but yet effective both in holding the electrolyte in the cell and in separating the anode from the cathode and the electrodes from the outside metal casing.

FIGURE 6 illustrates the fuel cell module of FIGURE 1 in a partially cross-sectional exploded view. As is apparent from this view, individual modules can be stacked or cascaded to provide a fuel cell system which will produce electrical current at substantially any voltage or amperage, depending upon whether the modules are connected in parallel or series. The fuel and oxygen can be supplied to the several modules from a common source by means of a manifold.

In the instant fuel cell modules, back-up plates for the anode are often desirable to support the thin palladium-silver membrane. A number of modifications of the back-up plate are possible and will be apparent to a skilled technician. Thus, FIGURES 7 and 8 illustrate two alternative designs.

In FIGURE 7 back-up plate 2 constructed from a metal such as nickel is dimpled and spot-welded at the dimples to the palladium-silver alloy membrane 1.

In FIGURE 8 Teflon spider 6 functions as a mutual support for both the anode 1 and cathode 4. In addition, the anode is supported by a nickel back-up plate 2.

In the present invention, the metal employed in manufacturing the fuel cell module can be any metal which will withstand the corrosive influences of the electrolyte at the operating temperatures of the cell. Because of its availability and its high resistance to corrosion, nickel is a preferred metal. The insulating material in the cell, including the spider, clearly shown in FIGURE 4 can be constructed from any electrical insulator which will withstand the corrosive influences of the fuel cell assembly at the operating temperatures of the cell. Because of its superior characteristics such as resistance to corrosion and its nature, permitting convenient machining of parts, etc., Teflon is a preferred material.

The anode employed in the instant fuel cell modules, as noted hereinbefore, is a non-porous palladium-silver alloy hydrogen diffusion membrane. Alloys containing from about 5–45% of silver have been demonstrated to produce good results with alloys composed of from about 20–35% silver showing optimum fuel cell electrode characteristics. At times it may be desirable to include minor amounts, that is, up to about 5% of an additional metal such as gold, tellurium, iridium or rhodium in the palladium-silver alloy. The thickness of the non-porous palladium-silver alloy membrane depends to a large extent upon the pressure differential to be applied across the membrane and upon the rapidity of diffusion desired. Diffusion of hydrogen gas through the membrane is proportional to the pressure differential across the electrode structure and the membrane's thickness. The minimum thickness is immaterial as long as the membrane is structurally able to withstand the necessary pressure of the fuel cell. Thus, it is usually desirable to use extremely thin membranes and support the membrane by external means, both from the standpoint of diffusion and economics. The preferred thickness of the membrane is approximately 0.5 to 10 mils. However, membranes of up to about 30 mils can be employed. Although the major portion of the electrode is constructed as a flat sheet, depending upon the support means, as is apparent from FIGURES 7 and 8, it may be desirable to machine the membrane to corrugate at least part of the anode structure.

While the anode can be an unactivated non-porous palladium-silver alloy membrane, it is preferred to apply a thin coating of black to the membrane to enhance the electrochemical performance characteristics, as well as protect the electrode against poisoning. The black can be palladium, platinum, palladium-rhodium, or rhodium. However, it has been found that palladium, at least on the fuel gas side of the anode, provides superior electrochemical characteristics. Additionally, palladium black has a greater tendency to adhere to the non-porous palladium-silver membrane and, therefore, is preferred. The blacks employed are obtained by known prior art means and can be deposited on the anode by electrolytic deposition. The palladium-silver anodes employed herein are described more fully in the Oswin and Oswin et al. copending applications, Serial Nos. 51,515 now U. S. Patent No. 3,092,517, and 190,695, filed August 24, 1960, and April 27, 1962, respectively. These applications provide a complete description of the unactivated anodes, the activated structures and methods of providing the activated anodes.

The cathode can be either homo-porous or bi-porous structures known in the prior art. The electrodes described by Francis T. Bacon in U.S. Patent No. 2,716,670 are particularly desirable. These electrodes are bi-porous nickel electrodes having a surface coating of lithiated nickel oxide. The lithiated nickel oxide film is highly resistant to oxidation, but yet readily conducts an electric current. Other cathodes found particularly effective are the cobalt-nickel activated bi-porous nickel electrodes, described more fully in the Lieb et al. copending application, Serial No. 165,212, filed January 9, 1962, now abandoned, entitled "Fuel Cell Electrodes."

The instant cells are hydrogen-oxygen or hydrogen-air systems. As is apparent, only hydrogen fuel can be employed with the hydrogen diffusion anode. Such systems are of particular interest since a hydrogen-oxygen cell has a higher theoretical output than any other known fuel-oxidizer combination. The waste product of the hydrogen-oxygen cell formed after the gases have reacted is water, which can be conveniently removed from the electrolyte. Inasmuch as the anode is non-porous, water formation cannot occur in the electrode structure but is formed only at the electrolyte side of the anode. This eliminates the problem of electrode flooding, noted as being a common problem with the bi-porous and homo-porous structures. Additionally, since only hydrogen is diffused through the activated non-porous palladium-silver alloy membrane, impure hydrogen containing carbon dioxide, carbon monoxide, water, methane, etc. can be used as the fuel. Pure hydrogen will diffuse through the membrane and the gaseous impurities are vented from the system. The impurities, being retained in the fuel compartment, cannot contaminate the electrolyte or block the electrode.

The instant fuel cell systems are operable within a fairly wide temperature range. However, for good hydrogen diffusion through the non-porous palladium-silver alloy membrane, it is desirable that the temperature of the system be in excess of about 25° C. and preferably not over 350° C., the optimum temperature range being in the neighborhood of 100° C. to 300° C.

The instant cells can be operated with either air or oxygen as the oxidizing agent. Additionally, a variety of electrolytes can be employed including aqueous alkaline materials such as potassium hydroxide, sodium hydroxide, lithium hydroxide, mixtures thereof, potassium carbonate and the alkanolamines. Acid electrolytes can be employed including sulfuric and phosphoric acids. If an acid electrolyte is selected, it can be advantageous to coat the surface fronting the electrolyte with platinum black due to its exceptional resistance to attack by acids.

A fuel cell substantially identical to that shown in FIGURE 1 of the drawing was constructed employing a palladium black activated non-porous palladium-silver alloy hydrogen diffusion anode having a thickness of 5 mils. The cathode was a bi-porous cobalt-nickel activated nickel electrode, more completely described in the aforementioned Lieb et al. co-pending application Serial No. 165,212. The electrolyte was a 75% aqueous potassium hydroxide solution. The operating temperature of the cell was 200° C. Impure hydrogen was fed into the system with pure hydrogen diffusing through the anode and the impurities being vented. Air was fed to the cathode. The cell at .945 volts, including 50 millivolts electrolyte IR drop, drew a current of 150 ma./cm.$^2$.

While various modifications of this invention are described, it should be appreciated that this invention is not restricted thereto, but that other embodiments will be apparent to one skilled in the art which fall within the scope and spirit of the invention and appended claims.

What is claimed is:

1. A self-contained fuel cell module suitable for cascading comprising a two-piece metal outer-casing with flanges, an anode assembly containing a non-porous palladium-silver alloy membrane and a metal back-up plate, said membrane being attached to said back-up plate, said back-up plate structurally cooperating with one piece of the two piece metal outer-casing being shaped to form a gas chamber behind said palladium silver alloy membrane and having diametrically opposed gas ports, and a cathode assembly containing a porous cathode and a back-up plate, said cathode being attached to said back-up plate, said cathode in conjunction with one piece of said two piece metal outer-casing being shaped to form a gas chamber behind said cathode and having opposed gas ports, said anodes and cathodes being separated by spacing and support means, said spacing containing an electrolyte, said module being rendered leak-proof by unitarily sealing the outer casings by peripheral welding of said flanges after assembly of the module.

2. The fuel cell module of claim 1 where the spacing and support means is a polytetrafluoroethylene spider.

3. A self-contained fuel cell module suitable for cascading comprising a two-piece metal outer casing, an anode assembly containing a non-porous palladium-silver membrane and a metal back-up plate, said membrane being attached to said back-up plate, said back-up plate being shaped to form a hydrogen chamber behind the membrane and having gas entry and exit ports, a cathode assembly containing a porous cathode and a back-up plate, said cathode being attached to said back-up plate, said back-up plate being recessed to form an oxidant chamber, a cover attached to said back up plate having gas entry and exit ports opposed to each other, and gasketing means to insulate said anode and said cathode from each other and the electrodes from the outer casing, said anode and cathode being separated by spacing and support means with an electrolyte being retained between the electrodes, said module being rendered leak-proof by unitarily sealing the outer casing after assembly of the module.

4. The fuel cell module of claim 3 wherein the spacing and support means is a polytetrafluoroethylene spider.

5. A self-contained fuel cell module suitable for cascading comprising a two piece metal outer-casing, an anode assembly containing a non-porous palladium-silver alloy membrane and a back-up plate, said membrane being attached to said back-up plate, said back-up plate structurally cooperating with the outer-casing to form a gas chamber behind said palladium-silver alloy membrane having opposed gas ports, and a cathode assembly containing a porous cathode and a back-up plate, said cathode being attached to said back-up plate, said cathode structurally cooperating with the outer-casing to form a gas chamber behind said cathode, said gas chamber having opposed gas ports, said anodes and cathodes being separated by spacing and support means, said spacing containing an electrolyte.

References Cited by the Examiner
UNITED STATES PATENTS

| | | | |
|---|---|---|---|
| 409,366 | 8/1889 | Mond et al. | 136—86 |
| 2,836,643 | 5/1958 | Sindel | 136—111 |
| 2,860,175 | 11/1958 | Justi | 136—86 |
| 2,914,596 | 11/1959 | Gorin et al. | 136—86 |
| 2,966,538 | 12/1960 | Bernot | 136—111 |
| 3,026,365 | 3/1962 | Hughes et al. | 136—100 |
| 3,088,990 | 5/1963 | Rightmire et al. | 136—86 |
| 3,101,285 | 8/1963 | Tantram et al. | 136—86 X |
| 3,180,762 | 4/1965 | Oswin | 136—86 |

FOREIGN PATENTS

| | | |
|---|---|---|
| 667,298 | 2/1952 | Great Britain. |
| 850,706 | 10/1960 | Great Britain. |

WINSTON A. DOUGLAS, *Primary Examiner.*

JOHN R. SPECK, *Examiner.*

H. FEELEY, A. B. CURTIS, *Assistant Examiners.*